United States Patent [19]

Herko et al.

[11] 4,030,015

[45] June 14, 1977

[54] PULSE WIDTH MODULATED VOLTAGE REGULATOR-CONVERTER/POWER CONVERTER HAVING PUSH-PUSH REGULATOR-CONVERTER MEANS

[75] Inventors: Joseph Michael Herko; James Maurice Joyce, both of Boca Raton, Fla.

[73] Assignee: International Business Machines Corporation, Armonk, N.Y.

[22] Filed: Oct. 20, 1975

[21] Appl. No.: 624,217

[52] U.S. Cl. .............................. 321/2; 323/DIG. 1
[51] Int. Cl.$^2$ ...................................... H02P 13/32
[58] Field of Search ............ 321/2; 323/17, DIG. 1

[56] References Cited
UNITED STATES PATENTS

| | | | |
|---|---|---|---|
| 3,350,629 | 10/1967 | Kirby | 323/DIG. 1 |
| 3,377,546 | 4/1968 | Schott | 323/DIG. 1 |
| 3,466,570 | 9/1969 | Webb | 321/2 |
| 3,670,234 | 6/1972 | Joyce | 321/2 |
| 3,772,588 | 11/1973 | Kelly et al. | 321/2 |
| 3,806,791 | 4/1974 | Johnson | 321/2 |
| 3,913,000 | 10/1975 | Cardwell | 323/17 |
| 3,978,393 | 4/1975 | Wisner et al. | 321/2 |

FOREIGN PATENTS OR APPLICATIONS 1,280,387  10/1968  Germany .............................. 321/2

*Primary Examiner*—William H. Beha, Jr.

*Attorney, Agent, or Firm*—John G. Wynn; Kenneth W. Hairston; J. Jancin, Jr.

[57] ABSTRACT

Disclosed herein is an improved pulse width modulated (PWM) voltage regulator-converter system which can function, alone, as a switched voltage regulator system or in combination with a switched power converter, synchronized therewith to form an improved voltage regulator-converter/power converter system. In the pulse width modulated voltage regulator-converter embodiment of the invention, secondary windings of a "current mode" regulator-converter interstage transformer are coupled to regulator-converter power transistors in a push-push circuit configuration. Signals generated by a system clock means and an error signal, derived from the output of an averaging filter, drive a pulse width modulated control means connected to the primary windings of the regulator-converter interstage transformer to thereby increase the maximum regulated output voltage of the voltage regulator-converter system after conditioning in the averaging filter. In the pulse width modulated voltage regulator-converter/power converter embodiment of the invention, the aforementioned output voltage of the voltage regulator-converter system is coupled directly to a switched power converter connected in a push-pull circuit configuration. In turn, additional signals generated by the system clock means switch the power converter in synchronizm with the voltage regulator-converter system.

3 Claims, 3 Drawing Figures

PULSE WIDTH MODULATED VOLTAGE REGULATOR-CONVERTER/POWER CONVERTER HAVING PUSH-PUSH REGULATOR-CONVERTER MEANS

BACKGROUND OF THE INVENTION

1. Field of the Invention:

The invention relates generally to improvements in pulse width modulated voltage regulator-converter systems having balanced current mode transformer drive means, and, in particular, to a voltage regulator-converter/power converter system having increased output power capability.

2. Description of the Prior Art:

Various types of switching regulator systems have been developed in the past, and, in many applications, they are superior to conventional series regulator systems. It is well known that conventional series regulator systems operate as a variable resistor which drops an unregulated input voltage or bulk voltage down to a fixed output voltage. The element utilized, generally, to drop the voltage down is a power transistor. Accordingly, interalia, the aforesaid power transistor must be capable of dissipating the power created by the voltage difference between the input or bulk voltage and the fixed output voltage at the load current. It is apparent that the power generated can become excessive, particularly, when the input or bulk voltage is not well regulated and the difference between the input and output voltages is large. Consequently, switching regulator systems have been found to be superior in applications where the output voltage of the system is considerably lower than the input or bulk voltage. It follows therefore, in aerospace systems, for example, that a missile with a 28 volt battery as its only power source containing a large number of integrated circuits which require a 5 volt supply can benefit from the utilization of a switching voltage regulator. In these applications, switching regulators, due mainly to their higher frequency of operation, are the most economical and reliable solution to power supply needs since power is conserved and the weight of transformers and filter inductors are reduced.

Notwithstanding the improvements aforementioned, there is and has been a need to further conserve power consistent with good regulation and high output power capability. Accordingly, U.S. Pat. No. 3,670,234, filed June 30, 1970, by James M. Joyce, entitled, "Pulse Width Modulated Voltage Regulator," and assigned to the same assignee as this application, discloses a voltage regulator-converter circuit that has improved efficiency and utilizes light weight components. Joyce accomplishes his objects by utilizing, interalia, an "interstage current mode transformer" thereby, improving the performance of a standard push-pull power switching regulator. In Joyce's system, a pulse width modulated voltage gates a control means which holds a pair of driver transistors in a conductive state during the dwell period of the modulated voltage. This causes a short across the primary side of the interstage current mode transformer, thereby, switching the power amplifier stage off completely allowing energy stored in the primary side of the interstage current mode transformer to be dissipated eliminating the possibility of the discharge of stored energy in the secondary of the aforementioned transformer. If the stored energy is discharged in the secondary winding, distortion of the waveforms would occur causing partial turning on of the power switching stage during the dwell time causing a decrease in efficiency. In addition, the turns ratio of the positive feedback and secondary windings connected to each power transistor is established to be equal to the desired current gain thereof providing thereby a fixed current gain for the switching transistors when they are in conduction. An advantage of this connection is reduced storage time in the power transistors, and accordingly, an additional increase in the efficiency. Also this connection, to a substantial degree, decreases crossover distortion and eliminates critical matching of the power transistors since the current gain thereof is dependent more on controllable external circuit parameters than transistor parameters.

Hence, the current mode transformer connection of Joyce solves many problems inherent in prior art switching voltage regulators. Consequently, this aspect of the Joyce invention is being utilized in the instant invention and will be more fully discussed in conjunction with the "Statement of the Operation" hereinafter. Nevertheless, there are problems in the prior art which have not been solved by the voltage regulator-converter of Joyce. These problems become more manifest when switching regulators are to be utilized in ground electronic systems on a worldwide basis. For example, the vast majority of ground electronic systems are designed and built to plug into a wall outlet. Accordingly, the AC voltage as the wall outlet varies, typically, depending on the country of location, from 100 volts RMS to 235 volts RMS. In the past, it was common to utilize 50 or 60 Hz step down transformers with secondary series regulators, in some cases, or secondary switching regulators, with proper filtering, to lower the bulk input voltage to a value that could be utilized with a switching regulator like Joyce's configuration, for example. However, even in ground electronic systems, a 50 or 60 Hz transformers present size, weight and cost factor penalties that are prohibitive in a business sense. In addition, the advantage of the Joyce system, in terms of overall efficiency, is not fully utilized by using the step down transformer means afornementioned. Of course, Joyce's system will operate with bulk voltages up to approximately 150 volts which corresponds to a line voltage of about 120 volts RMS. Thus, there is a need in the prior art for a switched regulator-converter that will not only operate efficiently at line voltages up to 120 volts RMS buyt will also operate, with the same efficiency, with line voltages up to 235 volts RMS corresponding to a bulk voltage of up to 400 volts.

One contribution to the art, by the instant invention, can best be understood by briefly pointing out a limitation in the Hoyce invention. Joyce utilizes a push-pull circuit configuration, i.e., power switching transistors connected in push-pull feeding an output transformer in push-pull. At the outset, it should be mentioned that the configuration, per se, is not a limitation, but the limitation is in the stress capability of "state of the art" power switching transistors. For example, it is believed that, when power switching transistors are being considered for use in switching regulators of the class herein discussed, $V_{CEO}$ (the collector to emitter voltage with the base opened) is the critical circuit parameter, notwithstanding current gain, switching speeds, etc., for reliable design. A $V_{CEO}$ rating in the range of 300–400 volts is the state of the art at the present time. Thus, assuming that a state of the art power switching transistor is used in Joyce, the upper limit on how high the bulk voltage can be is about 150 volts. This is true since the polarities on the output transformer are such as to increase the voltage across any one of the power switching transistors, when it is off, to two times the bulk voltage. In addition, other factors such as leakage inductance, voltage transients, etc., will increase the voltage from collector to emitter of the off transistor, even more, so that a conservative approximation would put the voltage at about 400 volts, the state of the art limit. Consequently, using this same rationale, a 400 volt bulk or input voltage would produce a stress voltage of about 1200, i.e., three times the maximum allowed by the state of the art power switching transistor at the present time. Accordingly, there is a need for a power switching regulator that has the advantages of the Joyce invention and yet be able to operate at an input or bulk voltage approximating the $V_{CEO}$ of state of the art power switching transistors.

Another prior art system disclosed in IBM TDB, Volume 17, No. 6, Nov. 1974, pages 1670–1671 to Duspiva, et al., appears to solve the problem of operating at higher input or bulk voltages by providing a switching regulator configuration having the collector of the power switching transistor tied directly to the bulk voltage in a single-ended configuration. The current mode transformer of Joyce is utilized as a coupling means between a pulse width modulated control means and the aforementioned single-ended switching transistor. Nevertheless, in order to ensure that the current mode transformer is balanced magnetically, auxiliary circuit means is provided to establish equal voltage-second products of the primary referenced from the center tap to the primary ends. Thus, while this current configuration accomplishes balanced operation of the current mode transformer, and the advantages attributed thereto, and is capable of operating at bulk voltages approaching the state of the art of power switching transistors, it is accomplished at the expense of output voltage capability. This is true because in order to reset the transformer magnetically, and avoid saturation thereof, a minimum off time of one-fourth the period of the switching voltages is necessary to ensure that the transformer has been reset magnetically. Hence, the filtered output voltage, utilizing a conservative analysis of the aforementioned prior art circuit, would yield only 75 percent of the bulk voltage at the averaging filter output. Thus, there is a need in the prior art for a switching regulator that operates such as to always drive the current mode transformer in equal and opposite directions in a half cycle at bulk voltages approaching the state of the art $V_{CEO}$ of power switching transistors without sacrificing output voltage capability. Accordingly, in the instant invention, the only limitations on-off time and on-time of the switching power transistors are the parameters of the switching device and the parasitic parameters of the other circuit components. For example, the present invention is capable of providing an output voltage after filtering, that is 97.6 percent of the input or bulk voltage.

The prior art, as indicated hereinabove, includes many advances in pulse width modulated voltage regulator-converter systems, including improvements in output power capability, voltage efficiency, and power efficiency. However, insofar as can be determined, no prior art switching voltage regulator-converter system incorporates all of the features and advantages of the instant invention.

OBJECTS OF THE INVENTION

Accordingly, a principle object of the present invention is to increase the maximum output voltage of a pulse width modulated voltage regulator-converter system that utilizes a "current mode" transformer coupled driver stage to a level hitherto unattainable with conventional current mode transformer coupled drivers.

A further object of the present invention is to operate a pulse width modulated voltage regulator-converter system at bulk voltages approaching the state of the art $V_{CEO}$ of power switching transistors while maintaining the maximum output voltage capability aforementioned.

Still a further object of the present invention is to increase the output power capability of a voltage regulator-converter/power converter system in an improved manner.

Yet another object of the present invention is to reduce the number of components in a voltage regulator-converter/power converter that accomplishes the foregoing, thereby improving the reliability thereof.

SUMMARY OF THE INVENTION

In accordance with these and other objects and features of the present invention, a pulse width modulated voltage regulator-converter/power converter is disclosed wherein the output voltage capability of the regulator-converter section thereof is increased to a value approaching the input or bulk voltage, and the output power capability of the combination is increased in an improved manner.

The voltage regulator-converter embodiment of the invention is characterized by having secondary windings of a current mode regulator-converter interstage transformer coupled to regulator-converter power transistors in a push-push circuit configuration. The primary windings of the regulator-converter interstage transformer are driven by a pulse width modulated logic control means connected thereto in a push-pull circuit configuration. Signals generated by a system clock means and an error signal, derived from the output of an averaging filter, drive the pulse width modulated control means such that logic signals generated at its output, at the primary windings of the regulator-converter interstage transformer, balance the magnetic operating point thereof and drive the regulator-converter power transistors, thereby increasing the maximum regulated output voltage of the voltage regulator-converter system after conditioning in the averaging filter. Another feature of this embodiment of the invention is that the collectors of the regulator-converter power transistors, being connected in a push-push circuit configuration, can be connected directly to an input or bulk voltage equal to the maximum $V_{CEO}$ rating of the transistors. Also, since this circuit configuration also operates as a frequency multiplier, the pulse width modulated driving pulses, being at a frequency F for optimum switching of the aforementioned power transistors are multiplied to a frequency 2F at the input of the averaging filter, thereby enabling a smaller value of inductance to be used thereby cutting the cost and weight thereof.

Another advantage of this embodiment is that the $V_{EBO}$ voltage of the regulator-converter power transistors is limited to less than the $BV_{EBO}$ rating thereof, thereby eliminating voltage stresses and the associated circuitry to accomplish same.

Yet another advantage of the configuration, aforementioned, is transformer isolation of the control circuitry, i.e., pulse width modulated logic control and system clock control, from the input or bulk voltage line.

The voltage regulator-converter/power converter embodiment of the invention is characterized by having the output voltage of the aforementioned voltage regulator-converter system coupled directly to a power converter connected in a push-pull circuit configuration. Signals generated by the aforementioned system clock means and an error signal, now derived from the output of a power converter filter means, drive the pulse width modulated control means as aforementioned. In turn, additional signals generated by the system clock means switch the power converter in synchronism with the voltage regulator-converter system, thereby lowering the output voltage and increasing the output power capability thereof. This embodiment, having all of the features and advantages aforementioned, in addition has the advantage of being able to operate at varying bulk voltages up to the $V_{CEO}$ of the regulator-converter power transistors by means of changing the output voltage of the voltage regulator-converter to correspond to less than the maximum operating voltage of the power converter section, i.e., approximately 150 volts.

Also, another advantage of this embodiment is the additional transformer isolation provided by a power converter interstage transformer and a power converter transformer which is part of the aforementioned power converter.

BRIEF DESCRIPTION OF THE DRAWINGS

The foregoing and other objects, novel features and advantages of the invention will be apparent from the following more particular description of the preferred embodiments as illustrated in the accompanying drawings, in which.

DESCRIPTION OF THE PREFERRED EMBODIMENTS

Figure 1:
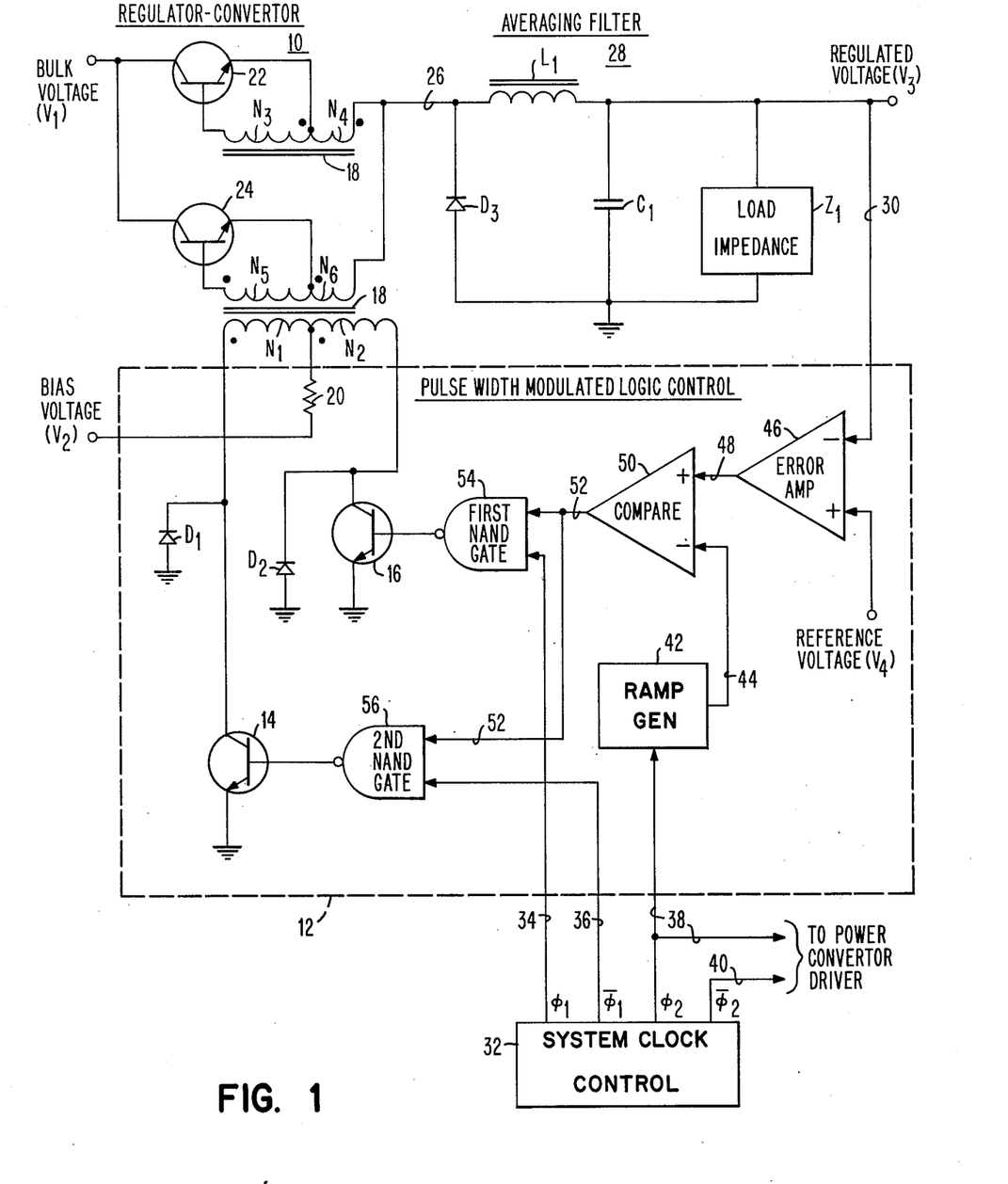
FIG. 1 depicts schematically and in block diagram form a voltage regulator-converter system in accordance with one embodiment of the present invention.

FIG. 1 shows an embodiment of a voltage regulator-converter system in which the invention is employed to, inter alia, increase the regulated output voltage $V_3$ as switched from a bulk voltage $V_1$. Basically, the voltage regulator-converter system comprises a regulator-converter section 10 including a regulator converter interstage transformer 18, a pulse width modulated logic control 12 for providing modulated pulses which vary in accordance with the magnitude of voltage fluctuations or ripple voltage of regulated output voltage $V_3$ at regulator converter output conductor 30, an averaging filter 28 and a system clock control 32 for providing system clock pulses $\phi_1$, $\bar{\phi}_1$, $\phi_2$ and $\bar{\phi}_2$ to the aforementioned pulse width modulated logic control 12 and to associated circuitry to be discussed hereinafter in conjunction with the embodiment of FIG. 2.

The pulse width modulated logic control 12 includes a first regulator converter driver transistor 14 having its collector connected to a primary winding $N_1$ of regulator converter interstage transformer 18 and a second regulator converter driver transistor 16 having its collector connected to a primary winding $N_2$ of regulator converter interstage transformer 18. Connected between the center tap of the primary side of regulator converter interstage transformer 18 and a bias voltage $V_2$ is regulator converter resistor 20 for limiting the current through primary windings $N_1$ and $N_2$ so that first and second regulator converter driver transistors 14 and 16 are not overstressed. Clamping diodes $D_1$ and $D_2$ are also connected to the collectors of first and second regulator converter driver transistors 14 and 16, respectively, and ground, to provide a current path when the aforementioned transistors are off and to clamp the large voltage transients that can be generated by the inductance of regulator converter interstage transformer 18 to approximately ground level.

Still referring to the embodiment of FIG. 1, a first regulator converter power transistor 22 having its collector connected to bulk voltage $V_1$ is driven by first secondary windings $N_3$ and $N_4$ of regulator converter interstage transformer 18. One end of winding $N_3$ is connected to the base of first regulator converter power transistor 22 and the other end of winding $N_3$ and an end of winding $N_4$, forming a tap, is connected to the emitter thereof. The other end of winding $N_4$ is connected to averaging filter input conductor 26. Also connected to bulk voltage $V_1$ is the collector of a second regulator converter power transistor 24. Second secondary windings $N_5$ and $N_6$ of regulator converter interstage transformer 18 drive the aforementioned power transistor. One end of winding $N_5$ is connected to the base and the other end of winding $N_5$ and an end of winding $N_6$, forming a tap, is connected to the emitter thereof. The other end of winding $N_6$ is connected to averaging filter input conductor 26 aforementioned.

The foregoing connection of first and second secondary windings of regulator converter interstage transformer 18 constitute a push-push current mode circuit configuration. A more detailed explanation of the aforementioned circuit connections and configuration will be explained more fully in the "Statement of the Operation" to follow hereinafter.

To continue, averaging filter input conductor 26 forms a connection between the output of regulator-converter section 10 and averaging filter 28. For purposes of the invention, averaging filter 28 includes an inductor $L_1$, a capacitor $C_1$ and a fly back diode $D_3$. The values of inductor $L_1$ and capacitor $C_1$ are such as to provide proper filtering of the switched waveform at averaging filter input conductor 26. Averaging filter 28 is designed so that there is some voltage fluctuation or ripple in the regulated voltage $V_3$ on regulator-converter output conductor 30. Also, fly back diode $D_3$ is utilized to provide a closed loop path for current flowing through inductor $L_1$ when first and second regulator converter power transistors 22 and 24 are off. As is well known, due to switching action, very large voltage transients can be generated at averaging filter input conductor 26 due to the inductance in the circuit. For the instant invention, the load impedance $Z_1$ can be resistive, inductive or capacitive or a combination thereof limited by the values of regulated output voltage $V_3$ and the current (average current) that first and second regulator converter power transistors 22 and 24 can provide without overstressing.

Still referring to FIG. 1, the regulated output voltage $V_3$, as determined by experimental results, is approximately 97.6 percent of input or bulk voltage $V_1$. Containing a small voltage fluctuation of ripple voltage, as controlled by averaging filter 28, voltage $V_3$ is applied to the negative or inverting input of error amplifier 46 via regulator converter output conductor 30. In addition, a reference voltage $V_4$ is applied to the positive or non-inverting input of error amplifier 46. For purposes of the invention, a typical value of $V_4$ is 5 volts. Error amplifier 46 is a differential amplifier which operates such that any difference between the ripple voltage of $V_3$ and voltage $V_4$ will result in an error signal at error amplifier output conductor 48. Also, concurrently, system clock control 32 generates a plurality of clock pulses $\phi_1$, $\bar{\phi}_1$, $\phi_2$ and $\bar{\phi}_2$ on 10 KHz clock output conductor 34, inverted 10KHz clock output conductor 36, 20KHz clock output conductor 38 and inverted 20KHz clock output conductor 40 respectively. For purposes of the invention, system clock control 32 includes a 40KHz RC oscillator, a pair of divide by 2 circuits to generate the 10KHz clock pulse and the 20KHz clock pulse. In addition, a pair of inverter circuits are utilized to provide the corresponding 180° out of phase clock pulses $\bar{\phi}_1$ and $\bar{\phi}_2$.

Consequently, clock pulse $\phi_2$ on 20KHz clock output conductor 38 drives ramp generator 42. A ramp voltage at ramp generator output conductor 44, in turn, is connected to the negative or inverting input of comparator 50. As shown in FIG. 1, error amplifier output conductor 48, aforementioned, is connected to the positive or non-inverting input of comparator 50. For purposes of the invention, a ramp voltage is utilized for the operation of comparator 50; however, it is well known that other types of voltages such as, triangle waves, can be used for this purpose (for example, see U.S. Pat. No. 3,670,234 to Joyce previously mentioned). The output of comparator 50 which will be at an up level or a down level depending on the crossover point of the error voltage signal at the positive terminal and the ramp voltage at the negative terminal (to be discussed more fully in the Statement of the Operation hereinafter). The output of comparator 50 at comparator output conductor 52 drives first NAND gate 54 and second NAND gate 56. Also clock pulse $\phi_1$, at 10KHz clock output conductor 34, and clock pulse $\bar{\phi}_1$, at inverted 10KHz clock output conductor 36 drive first NAND 54 and second NAND gate 56, respectively. Finally, the outputs of second NAND gate 56 and first NAND gate 54 drive first and second regulator converter driver transistors 14 and 16, respectively. For purposes of the invention, the NAND gates utilized are conventional in that when both inputs thereto are at an up level, a down level is provided at the output, and when either one of the inputs are at a down level an up level is provided at the output. Thus, first and second regulator converter driver transistors 14 and 16 are driven alternately and are connected to the primary windings of regulator converter interstage transformer 18 in a push-pull configuration. As aforementioned, the secondary windings of regulator converter interstage transformer 18 are connected to frist and second regulator converter power transistors 22 and 24 in a push-push configuration.

Figure 2:
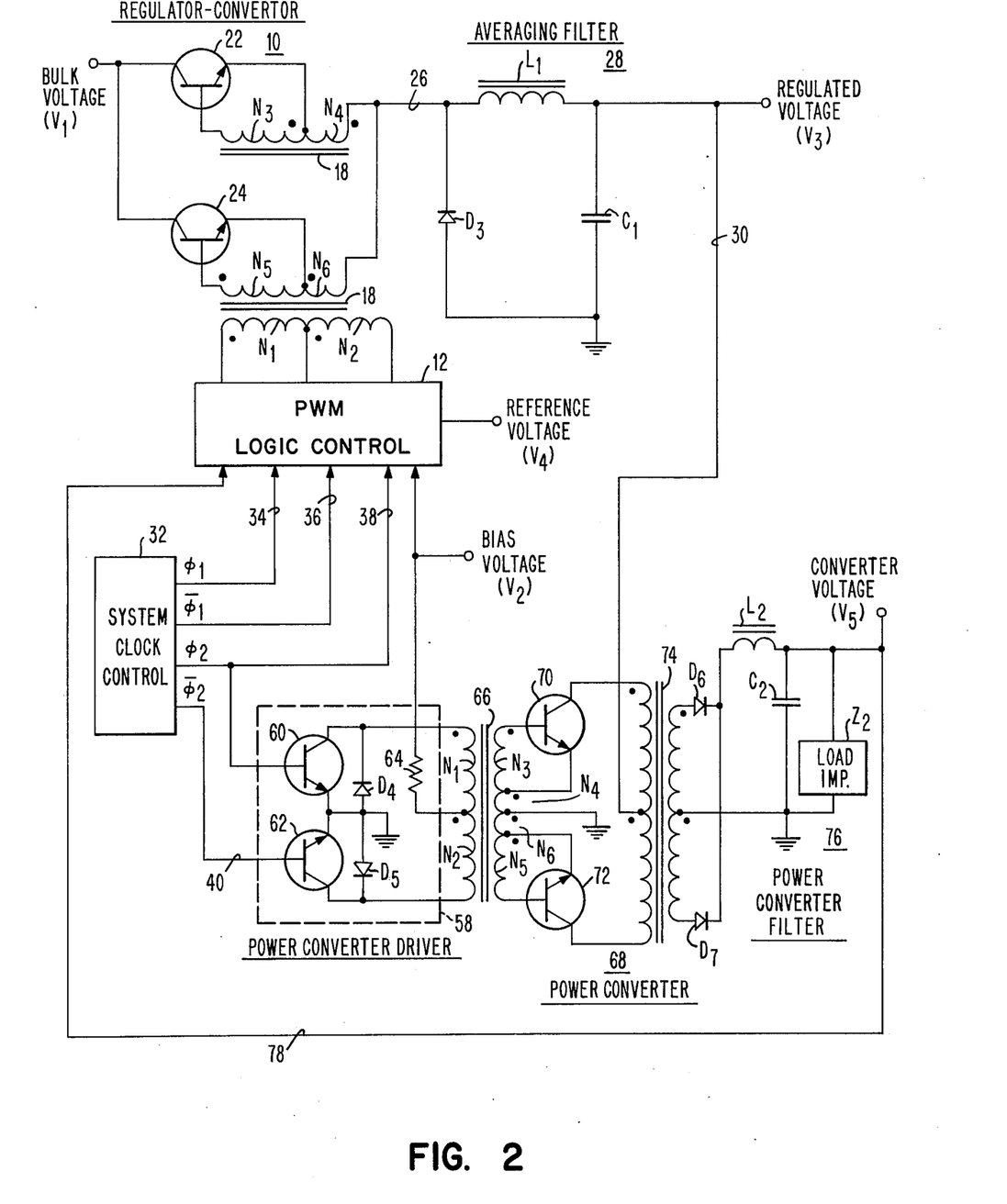
FIG. 2 depicts schematically and in block diagram form a voltage regulator-converter/power converter system in accordance with another embodiment of the present invention.

Referring now to FIG. 2, a voltage regulator-converter/power converter embodiment of the invention is depicted in block diagram and schematic form. All of the elements of the voltage regulator-converter system of FIG. 1 have been incorporated with power converter driver 58, power converter 68 and power converter filter 76 to form this embodiment of the invention. The aforementioned elements, except for certain modifications which will be explained hereinafter, are disclosed in U.S. Pat. No. 3,670,234 to Joyce, previously mentioned. Accordingly, coupled with the description hereintofollow, and the disclosure of Joyce, it is believed one skilled in the art can make and use the invention.

Briefly, system clock control 32 provides clock control pulses $\phi_2$ and $\bar{\phi}_2$ via 20KHz clock output conductor 38 and inverted 20 KHz clock output conductor 40 to first and second power converter driver transistors 60 and 62, respectively. The collector of first power converter driver transistor 60 is connected to primary winding $N_1$ of power converter interstage transformer 66, and the collector of second power converter driver transistor 62 is connected to primary winding $N_2$ of the aforementioned transformer. In addition, converter driver resistor 64 is connected between the center tap of the primary of power converter interstage transformer 66 and bias voltage $V_2$. Clamping diodes $D_4$ and $D_5$ are connected to the collectors of first power converter driver transistor 60 and second power converter driver transistor 62, respectively, and ground, to provide a current path when the aforementioned transistors are off and to clamp the large voltage transients that can be generated by the inductance of power converter interstage transformer 66 to approximately ground level. This portion of the embodiment of FIG. 2 is essentially the same as the embodiment of Joyce, except that there is no modulation of the clock control pulses $\phi_2$ and $\bar{\phi}_2$.

To continue, the secondary windings of converter interstage transformer 66 are connected to first and second power converter transistors 70 and 72 in a push-pull current mode configuration. Secondary winding $N_3$ is connected between the base and emitter of first power converter transistor 70. Also, connected to the emitter of the aforementioned transistor and ground is secondary winding $N_4$. In addition, secondary winding $N_5$ is connected between the base and emitter of second power converter transistor 72. Also, secondary winding $N_6$ is connected to the emitter of the aforementioned transistor and ground. Secondary windings $N_4$ and $N_6$ are regenerative feedback windings providing positive feedback to secondary windings $N_3$ and $N_5$, respectively. The collector of first power converter transistor 70 is connected to one end of the primary winding of power converter transformer 74, and the collector of second power converter transistor 72 is connected to the other end of the primary of the aforementioned transformer. The output regulated voltage $V_3$ is applied to the center tap of power converter transformer 74 via regulator converter output conductor 30. This portion of the embodiment of FIG. 2 is similar to the embodiment of U.S. Pat. No. 3,670,234 to Joyce, previously mentioned, except that the feedback windings $N_4$ and $N_6$ are connected to the emitters of first and second power converter transistors 70 and 72 rather than to the collectors as depicted in the Joyce patent. There is a slight advantage to this modification that will be explained more fully in conjunction with the Statement of the Operation, hereintofollow.

Finally, one end of the secondary winding of power converter transformer 74 is connected to the anode of rectifier diode $D_6$ and the other end of the secondary winding is connected to the anode of rectifier diode $D_7$. The center tap of the secondary winding is connected to ground. Rectifier diodes $D_6$ and $D_7$ are tied together at one end of an inductor $L_2$ with the other end of inductor $L_2$ connected to a capacitor $C_2$. The other end of capacitor $C_2$ is connected to ground. For purposes of the invention, the values of inductor $L_2$ and capacitor $C_2$ are such as to provide proper filtering of the switched waveform at the frequency of operation, but yet, to allow some voltage fluctuations, or ripple, in the converter output voltage $V_5$ on converter output conductor 78. This ripple voltage is fed to the negative or inverting input of error amplifier 46 which is a part of pulse width modulated logic control 12 (refer to FIG. 1). The load impedance $Z_2$ can be resistive, inductive or capacitive or a combination thereof limited only by the values of regulated output voltage $V_5$ and the current (average current) that first and second power converter transistors 70 and 72 can provide without overstressing.

STATEMENT OF THE OPERATION

Figure 3:
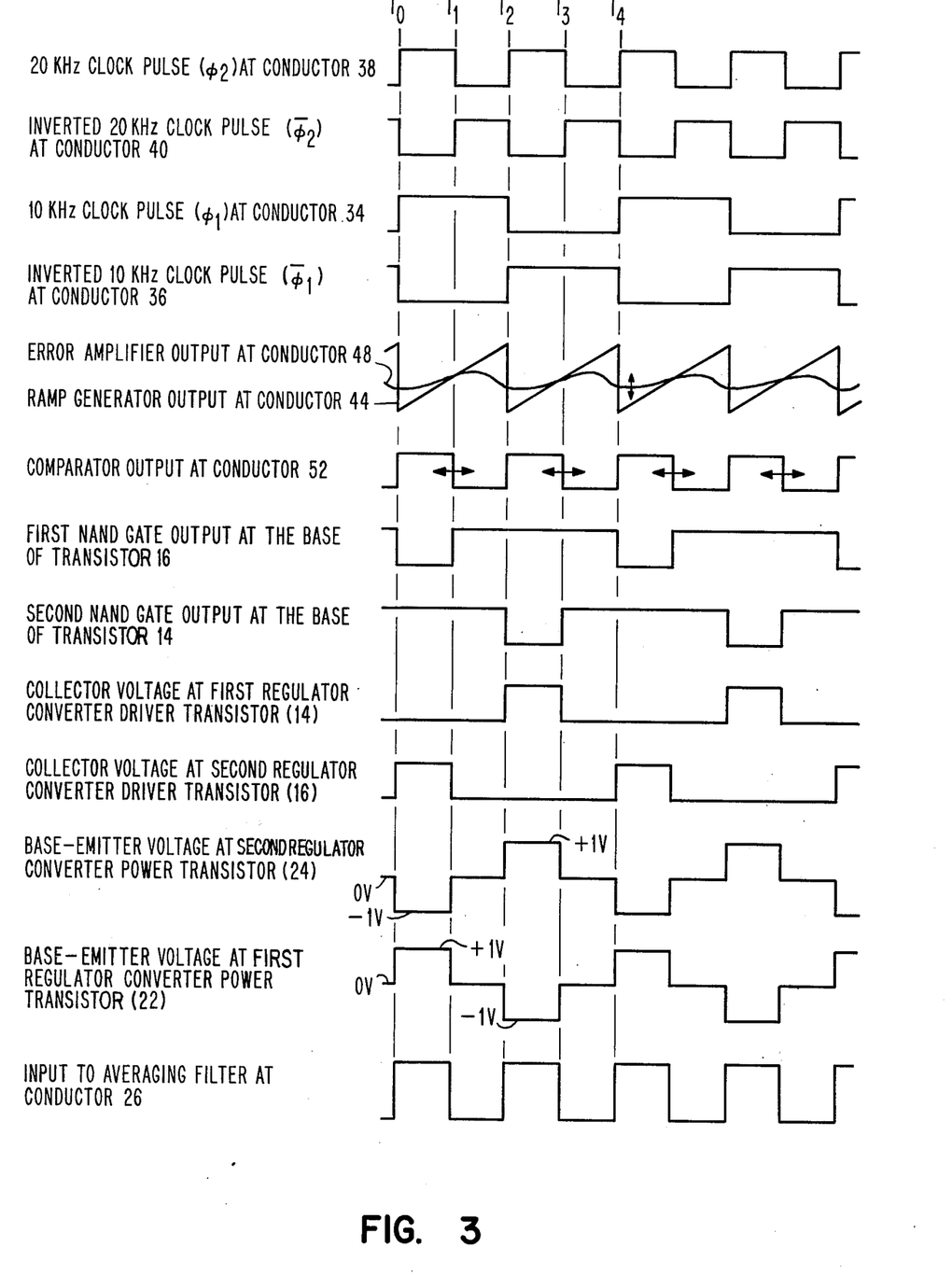
FIG. 3 is a timing diagram showing the interrelationship of various waveforms of the instant invention as depicted in FIGS. 1 and 2 during the operation thereof.

Details of the operation, according to the voltage regulator-converter system embodiment of the invention is explained in conjunction with FIGS. 1 and 3 viewed concurrently.

Referring now to FIG. 1 and the timing diagram of FIG. 3, at a time slightly prior to $T_0$, first and second regulator converter power transistors 22 and 24 are off. Accordingly, the voltage to averaging filter 28 at conductor 26 is at a down level. In addition, 20KHz clock pulse $\phi_2$ at conductor 38 is at a down level, inverted 20KHz clock pulse $\bar{\phi}_2$ at conductor 40 is at an up level, 10KHz clock pulse $\phi_1$ at conductor 34 is at a down level and inverted 10KHz clock pulse $\bar{\phi}_1$ at conductor 36 is at an up level. These clock pulses, as aforementioned, are generated by system clock control 32. Since 20KHz clock pulse $\phi_2$ at conductor 38 is at a down level, the output ramp voltage of ramp generator 42 at conductor 44 approaches a maximum positive level. At this time, the system conditions are such that error amplifier 46 senses the voltage fluctuations or ripple on regulated voltage $V_3$ at regulator converter output conductor 30 and compares the aforementioned ripple with a reference voltage $V_4$ providing at error amplifier output conductor 48 an error voltage as shown in the timing waveform diagram of FIG. 3. Since the error voltage is less than the ramp voltage, the output of comparator 50 at conductor 52 is at a down level. This signal feeds first inputs of first and second NAND gates 54 and 56, and since clock pulse $\phi_1$ at conductor 34 and clock pulse $\bar{\phi}_1$ at conductor 36 feed second inputs of first and second NAND gates 54 and 56, respectively, the output of first NAND gate 54 at the base of second regulator converter driver transistor 16 is at an up level, and, accordingly, the output of second NAND 56 at the base of first regulator converter driver transistor 14 is at an up level. Consequently, with the foregoing initial conditions, the collector voltages at first and second regulator converter driver transistors 14 and 16 are both at a down level, thereby shorting the primary windings $N_1$ and $N_2$ of regulator converter interstage transformer 18. Since no voltage is being generated across either of the primary windings $N_1$ or $N_2$, first secondary windings $N_3$ and $N_4$ and second secondary windings $N_5$ and $N_6$ of regulator converter interstage transformer 18 are effectively shorted. Accordingly, as aforementioned, first and second regulator converter power transistors 22 and 24 are off. Regulator converter resistor 20 is utilized to limit the current through the secondary windings $N_1$ and $N_2$ so that first and second regulator converter driver transistors 14 and 16 are not overstressed.

At a time slightly subsequent to $T_0$, the voltage at the output of ramp generator 42 at conductor 44 is below the error voltage at error amplifier output conductor 48. Accordingly, the output of comparator 50 at comparator output conductor 52 is at an up level. Since at this point in time, clock pulses $\phi_1$ and $\bar{\phi}_1$ at conductors 34 and 36 are at up and down levels respectively, the output of first NAND gate 54 at the base of second regulator converter driver transistor 16 is at a down level turning off the aforementioned transistor. However, since clock pulse $\phi_1$ at second input of second NAND gate 56 is at a down level the output of second NAND 56 at the base of first regulator converter driver transistor 14 remains at an up level, and, accordingly, the aforementioned transistor stays on.

Still referring to FIG. 1 and the timing diagram of FIG. 3, since first regulator converter driver transistor 14 is on and second regulator converter driver transistor 16 is off, current flows through regulator converter resistor 20 through primary winding $N_1$ through first regulator converter driver transistor 14 to ground creating, thereby, a plusminus voltage drop on primary winding $N_1$ with the positive voltage polarity, in this case, opposite the dot plurality indicated for winding $N_1$. Thus, since the voltage at the dot is minus, first secondary winding $N_3$ has a plus voltage from base to emitter of first regulator converter power transistor 22. Hence, a small amount of current flows through the base allowing collector current, and accordingly, emitter current to flow through first secondary winding $N_4$. The turns ratio $N_4/N_3$, for purposes of the invention is five to one (5 to 1). Thus, residual drive is provided to the base, and consequently, the base current will always be a fixed ratio of the emitter current, regardless of the load seen by the above mentioned transistor. In addition, winding $N_4$ is connected with respect to winding $N_3$ in a positive regenerative configuration so that the feedback current in this case one-fifth of the emitter current combines with the current in winding $N_3$, thereby turning the transistor on harder. (This is the basic current mode transformer drive concept disclosed in U.S. Pat. No. 3,670,234 to Joyce previously mentioned). Finally, since the dot pluralities as such as to cause a negative voltage at the dot plurality of winding $N_5$, and, accordingly, at the base of second regulator converter power transistor 24, transistor 24 is off. Thus, the voltage at averaging filter input conductor 26 is at an up level and remains at this level until a time slightly prior to $T_1$ as depicted in FIG. 3.

Between the times $T_0$ to $T_1$, the voltage at conductor 26 is filtered by averaging filter 28 providing at regulator converter output conductor 30, a DC level having voltage fluctuations or ripple thereon. This ripple, after conditioning in error amplifier 46, rises slightly, as indicated in FIG. 3, until it corresponds to the level of the ramp generator voltage at conductor 44. At this crossover point, which occurs at time $T_1$, the output of comparator 50 at conductor 52 is at a down level. As is evident from the waveforms in FIG. 3, when the error voltage at conductor 48 is greater than the ramp voltage at conductor 44, the output of comparator 50 will be at an up level, and, conversely, when the error voltage at conductor 48 is less than the value of the ramp voltage at conductor 44, the output of comparator 50 at conductor 52 is at a down level. Continuing, the output of comparator 50 being at a down level, turns first NAND gate 54 on, thereby turning second regulator converter driver transistor 16 on. Also, at this point in time, the output of second NAND gate 56 at the base of first regulator converter driver transistor 14 is still at an up level, and accordingly, transistor 14 stays on. During the time period that transistors 14 and 16 are both on, the primary windings $N_1$ and $N_2$ of regulator converter interstage transformer 18 are shorted, thereby removing all magnetizing current therein, maintaining magnetic balance thereof. Thus, shorting of the primary windings $N_1$ and $N_2$ of regulator converter interstage transformer 18, in effect, shorts the secondary windings thereof turning off first regulator converter power transistor 22. Second regulator converter power transistor 24 is already off and will continue to stay off, as depicted by the base-emitter voltages in FIG. 3. Consequently, the voltage to averaging filter 28 at averaging filter conductor 26 is at a down level. During this off time, $T_1$ to $T_2$, the error voltage, as seen at error amplifier output conductor 48, decays and the ramp voltage at conductor 44 continues to a maximum level reached at time $T_2$.

At time $T_2$, clock pulse $\phi_2$ at conductor 38 is at an up level. Since the ramp voltage at conductor 44 is less than the error voltage at conductor 48, comparator 50 provides an up level at comparator output conductor 52. Thus, as apparent from the previous discussion, the output voltage of second NAND gate 56 at the base of first regulator converter driver transistor 14 is now at a down level turning the aforementioned transistor off. In addition, the conditions are such as to keep second regulator converter driver transistor 16 on. In this case, first regulator converter power transistor 22 is reversed biased and second regulator converter power transistor 24 is forward biased as shown by the base-emitter voltages in FIG. 3. As substantially described before in conjunction with the turning on of first regulator converter power transistor 22, similarly, second regulator converter power transistor 24 turns on slightly, and then due to the regenerative interaction of secondary windings $N_5$ and $N_6$ of regulator converter interstage transformer 18, transistor 24 turns on harder. The voltage at averaging filter input conductor 26 is now at an up level and will stay at this level until time $T_3$.

During the times $T_3$ to $T_4$, the operation is substantially the same as previously discussed between the time periods $T_1$ to $T_2$. During this time, the output of comparator 50 at comparator output conductor 52 is at a down level. Consequently, the outputs of first and second NAND gates 54 and 56 at the bases of second regulator converter driver transistor 16 and first regulator converter driver transistor 14, respectively, are at up levels, thereby turning converter driver transistor 14 on and maintaining the on condition of regulator converter driver transistor 16. With this condition, the primary windings $N_1$ and $N_2$ of regulator converter interstage transformer 18 are shorted, thereby shorting first and second secondary windings thereof. Accordingly, the voltage to averaging filter 28 at averaging filter input conductor 26 is at a down level. During this time, as aforementioned, transistors 14 and 16 are on, thus shorting the primary windings of regulator converter interstage transformer 18 removing all magnetizing current therefrom. Thus, the aforementioned transformer has been driven, during a complete cycle of operation, in equal and opposite directions, thereby balancing the magnetic operating point. With this mode of operation, the transformer is never allowed to saturate. Accordingly, first and second regulator converter power transistors 22 and 24 are operated in a linear mode.

Referring now to the embodiment of FIG. 2, the operation is substantially the same except that now regulator converter output conductor 30 is connected to the center tap of power converter transformer 74. In addition, clock pulses $\phi_2$ and $\bar{\phi}_2$ at 20KHz clock output conductor 38 and inverted 20KHz output conductor 40, respectively, drive the bases of first and second power converter driver transistors 60 and 62. The operation of the aforementioned transistors are substantially the same as previously described in conjunction with the operation of transistors 14 and 16. It should be mentioned that power converter interstage transformer 66 is connected in a push-pull current mode configuration. This circuit is substantially the same as disclosed in U.S. Pat. No. 3,670,234 to Joyce, previously mentioned. The basic difference is that power converter driver 58 is not driven with a pulse width modulated voltage but, instead, an unmodulated voltage such that it is in synchronism with the voltage regulator-converter system aforementioned in conjunction with FIG. 1. Also the current mode configuration for power converter 58 has feedback windings $N_4$ and $N_6$ connected in the emitter circuits rather than in the collector circuit as disclosed in the previously mentioned Joyce patent. The present invention is suited to operate at higher voltages than the disclosed circuit of Joyce, consequently the emitter feedback connection aforementioned, reduces coupling noise between the transformer windings at the higher voltage of operation. Continuing, power converter 68, comprising first and second power converter transistors 70 and 72 is switched on by the aforementioned clock pulses, thereby driving power converter transformer 74. For purposes of the invention, the aforementioned transformer is a step down transformer having a turns ratio of approximately twenty to one (20 to 1). It should be mentioned that no regulation takes place in the power converter stage. After rectification by means of diodes $D_6$ and $D_7$ and filtering by power converter filter 76 comprising inductor $L_2$ and capacitor $C_2$, the output voltage $V_5$ at conductor 78 is fed back to the negative or inverting input of error amplifier 46, a functional element oof pulse width modulated logic control 12. The positive or non-inverting input of error amplifier 46, as shown in FIG. 1, has a reference voltage $V_4$ that is adjusted to give an error voltage at error amplifier output conductor 48 substantially as shown in FIG. 3.

Consequently, the voltage regulator-converter system is utilized in FIG. 2 as a pre-regulator to provide a regulated voltage at conductor 30 with the basic power conversion taking place in power converter 68. Since the regulated voltage $V_3$ at conductor 30 approximates the bulk input voltage $V_1$, the total power efficiency of the system of FIG. 2, and, accordingly, the power capability is increased. Moreover, the voltage regulator-converter/power converter embodiment of FIG. 2 is capable of operating over a wide range of bulk input voltages with maximum efficiency. At bulk voltages of less than 150 volts, the system is operated as substantially described. At bulk voltages of greater than 150 volts, reference voltage $V_4$ (see FIG. 1) is adjusted such that the voltage at conductor 30 is 150 volts or less. It should be mentioned that changing the value of reference voltage $V_4$ in essence changes the duty cycle of the voltage of averaging filter 28 at conductor 26, and, accordingly changes the regulated voltage $V_3$.

Although the embodiments shown in FIGS. 1 and 2 utilize a pair of first and second regulator converter power transistors 22 and 24, it is evident, from the embodiments depicted, that additional power transistors can be connected in parallel, with the aforementioned transistors, to increase the current switching capability of the system. The way of accomplishing this, in practice, is to insert resistors in the emitter circuit to balance the transistor operating voltages. This configuration, although not depicted is considered within the scope of the invention.

Accordingly, while the invention has been particularly described with reference to the preferred embodiments thereof, it will be understood by those skilled in the art, that various changes in form and detail may be made therein without departing from the spirit and scope of the invention.

What is claimed is:

1. A regulator-converter for regulating a bulk voltage to a maximum regulated output voltage comprising, in combination:
   clock means for generating first, second and third clock pulses at first, second and third outputs, respectively, of said clock means, said first clock pulse being at a frequency (F), said second clock pulse being at a frequency (F) and 180° out phase with said first clock pulse and said third clock pulse being at a frequency (2F);
   control means being driven by said first, second and third clock pulses and responsive to a ripple voltage on said regulated output voltage for generating, alternately, pulse width modulated control voltages at a frequency (F) at first and second outputs;
   regulator means having a first input operably connected to said first output of said control means, a second input operably connected to said second output of said control means and a third input connected to said bulk voltage for providing a switched voltage at a frequency (2F) at its output substantially equal in amplitude to said bulk voltage and in response to said amplified pulse width modulated control voltages at a frequency (F);
   said regulator means being comprised of a regulator interstage transformer having one end of a primary winding connected to said first output of said control means, the other end of said primary winding connected to said second output of said control means and a center tap connected by means of a current limiting resistor to a bias voltage, and said regulator interstage transformer having first and second secondary winding;
   a first regulator power transistor having its collector connected to said bulk voltage, its base connected to one end of said first secondary winding and its emitter connected to a tapped winding; and
   a second regulator power transistor having its collector connected to said bulk voltage, its base connected to one end of said second secondary winding and its emitter connected to a tapped winding,
   the other end of said first secondary winding being connected to the other end of said second secondary winding thereby forming said output of said regulator means; and
   averaging filter means connected to said output of said regulator means for filtering said switched voltage providing at its output a regulated voltage approximating said bulk voltage.

2. The regulator-converter of claim 1 wherein said control means comprises, in combination:
   ramp generator means driven by said third clock pulse for generating a ramp voltage at the output of said ramp generator;
   error amplifier means having a first input connected to said output of said averaging filter means and a second input connected to a reference voltage for differentiating between said ripple voltage on said regulated output voltage and said reference voltage providing at its output an error voltage;
   comparator means having a first input connected to said output of said ramp generator means and a second input connected to said output of said error amplifier means for comparing said ramp voltage and said error voltage such that the output voltage of said comparator means is at an up level when said ramp voltage is less that said error voltage and is at a down level when said ramp voltage is greater than said error voltage;
   a first NAND gate having a first input connected to said output of said comparator means and a second input connected to said first output of said clock means, the output voltage of said first NAND gate being at an up level when either one of the inputs thereto is at a down level, and when both inputs thereto are at an up level said output voltage is at a down level;
   a second NAND gate having a first input connected to said output of said comparator means and a second input connected to said second output of said clock means, the output voltage of said second NAND gate being at an up level when either of the inputs thereto is at a down level, and when both inputs thereto are at an up level, said output voltage is at a down level;
   a first regulator driver transistor having its base connected to said output of said second NAND gate, its emitter connected to ground and its collector, with a first clamping diode connected thereto, connected at said first output of said control means for providing one of said amplified pulse width modulated control voltages, and said first clamping diode providing a current path to ground when said first regulator driver transistor is off; and
   a second regulator driver transistor having its base connected to said output of said first NAND gate, its emitter connected to ground and its collector, with a second clamping diode connected thereto, connected at second output of said control means for providing the other one of said amplified pulse width modulated control voltages, and said second clamping diode providing a current path to ground when said second regulator driver transistor is off.

3. A regulator-converter/power converter for regulating and converting a bulk voltage to a stepped down isolated regulated output voltage having improved output power capability comprising, in combination:
   clock means for generating first, second, third and fourth clock pulses at first, second, third and fourth outputs, respectively, of said clock means, said first clock pulse being at a frequency (F), said second clock pulse being at a frequency 180° out phase with said first clock pulse, said third clock pulse being at a frequency (2F) and said fourth clock pulse being at a frequency (2F) and 180° out of phase with said third clock pulse;

control means being driven by said first, second and third clock pulses and responsive to a ripple voltage on said regulated output voltage for generating, alternately, pulse width modulated control voltages at a frequency (F) at first and second outputs;

regulator means having a first input operably connected to said first output of said control means, a second input operably connected to said second output of said control means and a third input connected to said bulk voltage for providing a switched voltage at a frequency (2F) at its output substantially equal in amplitude to said bulk voltage and in response to said amplified pulse width modulated control voltages at a frequency (F);

averaging filter means connected to said output of said regulator means being responsive to said switched voltage of said regulator means for providing a filtered regulated voltage at an output;

converter driver means having inputs connected to said third and fourth unmodulated clock pulses for amplifying said third and fourth clock pulses, alternately, providing at first and second outputs third and fourth amplified clock pulses, respectively;

converter means configured in a "current mode" push-pull circuit having a first input operably connected to said first output of said converter driver means, a second input operably connected to said second output of said converter driver means and a third input connected to said output of said averaging filter means for providing at its outputs, alternately, stepped down switched regulated voltages in synchronism with said switched voltage of said regulator means, and in response to said amplified clock pulses and said regulated voltage;

said converter means being comprised of a converter interstage transformer having one end of a primary winding connected to said first output of said converter driver means, the other end of said primary winding being connected to said second output of said converter driver means, and said converter interstage transformer having first, second, third and fourth secondary windings;

a first power converter transistor having its base connected to one end of said first secondary winding, its emitter connected to the other end of said first secondary winding and to one end of said second secondary winding, and its collector connected to one end of a primary winding of a power converter transformer; the other end of said second secondary winding being connected to ground; and a second power converter transistor having its base connected to one end of said fourth secondary winding, its emitter connected to the other end of said fourth secondary winding and to one end of said third secondary winding, and its collector connected to the other end of said primary winding of said power converter transformer, the other end of said third secondary winding being connected to ground;

said second and third secondary windings being regenerative feedback windings to provide positive feedback to said first and fourth secondary windings and thereby reduce coupling noise between said primary and secondary windings;

said primary winding of said power converter transformer having said output of said averaging filter means connected at its center tap, said power converter transformers secondary winding being said outputs of said converter means;

full wave rectification means operably connected to said outputs of said converter means for rectifying said stepped down switched regulated voltages of said converter means, a full wave rectified voltage being provided at the output of said full wave rectification means; and converter filter means having a series inductor and a shunt capacitor to ground, one end of said series conductor being connected to said output of said full wave rectification means and the other end of said series inductor being connected to a load thereby providing said ripple voltage on said regulated output voltage.

* * * * *

UNITED STATES PATENT OFFICE
CERTIFICATE OF CORRECTION

Patent No. 4,030,015         Dated June 14, 1977

Inventor(s) Joseph M. Herko et al

It is certified that error appears in the above-identified patent and that said Letters Patent are hereby corrected as shown below:

Column 2, line 16, "the current mode transformer connection"

should read -- the "current mode transformer" connection --.

Signed and Sealed this

Third Day of October 1978

[SEAL]

Attest:

RUTH C. MASON  
Attesting Officer

DONALD W. BANNER  
Commissioner of Patents and Trademarks